(12) United States Patent
Hitomi (10) Patent No.: US 6,607,154 B2
(45) Date of Patent: Aug. 19, 2003

(54) SPOOL FOR SPINNING REEL (75) Inventor: Yasuhiro Hitomi, Hashimoto (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 10/158,108

(22) Filed: May 31, 2002

(65) Prior Publication Data
US 2003/0001035 A1 Jan. 2, 2003

(30) Foreign Application Priority Data
Jul. 2, 2001 (JP) ........................................ 2001-200624

(51) Int. Cl.⁷ ................................................. A01K 89/01
(52) U.S. Cl. ........................ 242/322; 242/321; 242/311
(58) Field of Search ............................... 242/322, 321, 242/224, 310, 311

(56) References Cited

U.S. PATENT DOCUMENTS

| | | | | |
|---|---|---|---|---|
| 4,995,571 A | * | 2/1991 | Kawai | 242/249 |
| 5,160,099 A | * | 11/1992 | Furomoto | 242/321 |
| 5,655,723 A | * | 8/1997 | Moosberg | 242/322 |
| 5,875,986 A | * | 3/1999 | Miyazaki et al. | 242/261 |
| 6,176,446 B1 | * | 1/2001 | Sato | 242/319 |
| 6,286,772 B1 | * | 9/2001 | Koelewyn | 242/246 |

FOREIGN PATENT DOCUMENTS

| | | |
|---|---|---|
| EP | 1 108 355 A1 | 6/2001 |
| EP | 1 108 356 A1 | 6/2001 |

* cited by examiner

Primary Examiner—Kathy Matecki
Assistant Examiner—Evan Langdon
(74) Attorney, Agent, or Firm—Shinjyu Global IP Counselors, LLP (57) ABSTRACT Spool is mounted rotatably via bearings on spool shaft of a spinning-reel, and is furnished with first and second bearing housings, bobbin trunk, and front and rear flanges. At least a part of second bearing housing is made of metal. The bobbin trunk, which is furnished with the first and second bearing housings, is a synthetic-resin manufacture outer circumferentially onto which fishing line is wrapped. The front and rear flanges are arranged on the front and rear of the bobbin trunk, and are larger in diameter than the bobbin trunk. With the present invention, it is easier to take out and replace the spool bearing although the bobbin trunk is subjected to compressive force.

18 Claims, 5 Drawing Sheets

SPOOL FOR SPINNING REEL

BACKGROUND OF THE INVENTION

1. Field of the Invention

This invention generally relates to line-winding spools. More specifically, the present invention relates to spools rotatably mounted via a bearing on the spool shaft in spinning-reels.

2. Background Information

Spinning reels in general are equipped with a reel unit rotatably carrying a handle, a line-guiding rotor mounted rotatably in the reel unit, and a spool around which fishing line guided by the rotor is wound. The spinning-reel spool is shiftable front and back relative to the reel unit and includes: a bobbin trunk around which the fishing line winds; a front flange having a larger outer diameter than the outer diameter of the bobbin trunk and disposed on the front end of the bobbin trunk; and a round cylindrical skirt portion provided at the rear of the bobbin trunk.

With spools of this sort, in order to reduce costs and design for an overall lighter weight spool, it is known to form the bobbin trunk from materials such as synthetic resin. Likewise, in order to improve drag performance it is known to mount the bobbin trunk rotatably on the spool shaft via a bearing. The bearing is fitted in between the spool shaft and the inner-circumferential surface of the bobbin trunk.

Issues Invention is to Solve

With the aforementioned conventional synthetic-resin-manufactured spools carried on the spool shaft via a bearing, the fact that the bobbin trunk is made of plastic, which is comparatively low in strength, risks that when fishing line is wound on powerfully and compressive forces act on the bobbin trunk, the bobbin trunk will compressively deform. A compressively deformed bobbin trunk makes it hard to pull out the bearing fitted to the inner circumferential surface of the bobbin trunk, making it difficult to take out and replace the bearing.

In view of the above, there exists a need for spools which overcomes the above mentioned problems in the prior art. This invention addresses this need in the prior art as well as other needs, which will become apparent to those skilled in the art from this disclosure.

SUMMARY OF THE INVENTION

An object of the present invention is to make it easier to take out and replace the spool bearing in spinning reels despite effects of compressive force on the bobbin trunk.

A spool in accordance with the first aspect of the invention is mounted rotatably via a bearing on the spool shaft in a spinning-reel, and the spool is furnished with a bearing housing, a bobbin trunk, and front and rear flanges. At least a part of where the bearing housing houses the bearing is made of metal. The bobbin trunk, in which the bearing housing is provided and outer-circumferentially onto which fishing line wraps, is manufactured of a synthetic resin. The front and rear flanges are larger in diameter than, and disposed on the front and rear of, the bobbin trunk.

The bobbin trunk in this spool is made of a synthetic resin in order to reduce its cost and design for lightened weight. Nevertheless, the bearing housing provided in the bobbin trunk is reinforced taking strength into consideration, by making it at least in part of a metal whose strength is higher than that of the synthetic resin. Herein, the fact that the bearing housing is reinforced by making it at least in part of a metal whose strength is higher than that of the synthetic resin means that the bearing housing is not liable to get compressed, and that even should compressive force have an effect on the bobbin trunk, taking out and replacing the spool bearing will be easy.

A spinning-reel spool in accordance with the second aspect of the invention is the spool set forth in the first aspect, further furnished with a skirt extending rearward from the outer circumferential part of the rear flange portion. This is to cover the periphery of the rotor for preventing the fishing line from snarling, even with the diameter of the bobbin trunk being smaller than the diameter of the round cylindrical portion of the rotor.

A spinning-reel spool in accordance with the third aspect of the invention is the spool set forth in the first or second aspect, wherein the bearing housing has a first tubular portion made of metal, in which the bearing is housed. The first tubular portion made of metal reinforces the tubular bobbin trunk.

A spinning-reel spool in accordance with the fourth aspect of the invention is the spool set forth in the third aspect, wherein the bearing housing has a second tubular portion made of a synthetic resin, covering said first tubular portion. With this structure, it is possible to lighten its weight while reducing its cost, compared to manufacturing the bearing housing entirely of metal.

A spinning-reel spool in accordance with the fifth aspect of the invention is the spool set forth in third or fourth aspect, wherein the bearing housing portion includes a circular plate portion formed integrally with the first tubular portion and fixedly coupled to a rear face of the bobbin trunk. In this case, since the first tubular portion and the circular portion are formed integrally, the circular portion can strengthen the first tubular portion and the tubular bobbin trunk at the same time.

A spinning-reel spool in accordance with the sixth aspect of the invention is the spool set forth in the first or second aspect, wherein the bearing housing in its entirety is made of metal. In this case, the strength of the bearing housing is heightened further because it is entirely made of metal.

A spinning-reel spool in accordance with the seventh aspect of the invention is the spool set forth in one of the first through the sixth aspects, wherein at least a part of the bearing housing is formed integrally with the rear flange. In this case, the fact that the metal-manufactured bearing housing and the rear flange are formed integrally enables dual reinforcement of the rear portion of the bobbin trunk A spinning-reel spool in accordance with the eighth aspect of the invention is the spool set forth in any of the second through seventh aspects, wherein the bobbin trunk where fishing line wraps onto it outer-circumferentially is covered by a sheathing member made of sheet metal. In this case, the fact that the surface of the plastic bobbin trunk—which serves to lighten the weight and reduce costs—is encased by the sheathing member lends the outward appearance the classic feel of metallic luster.

A spinning-reel spool in accordance with the ninth aspect of the invention is the spool set forth in the eighth aspect, wherein the skirt is formed integrally with the sheathing member. In this case, the outward appearance, reaching from the periphery of the bobbin trunk to the prominent skirt, is lent the classic feel of metallic luster.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
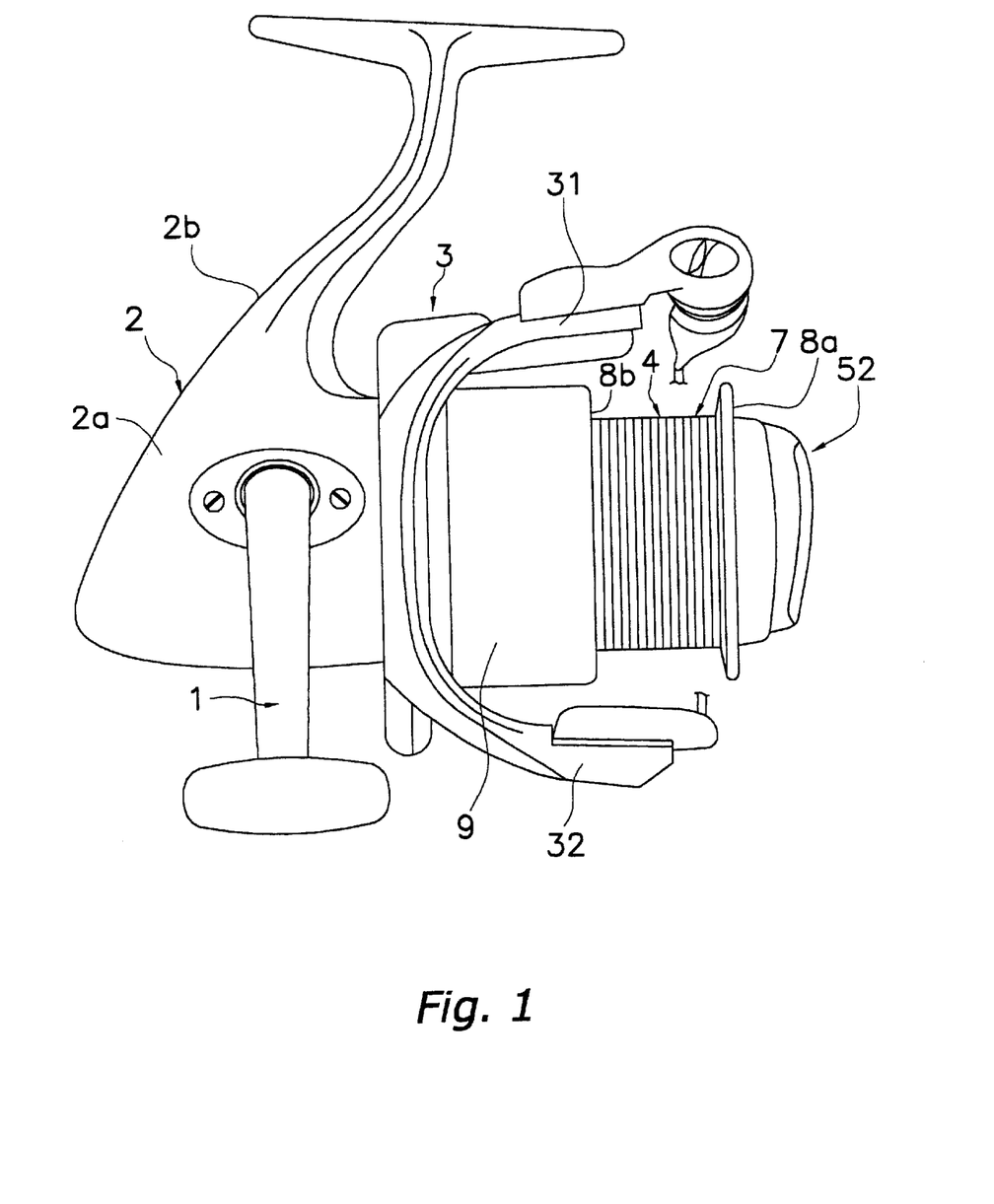
FIG. 1 is a right-side view of a spinning reel according to the first embodiment of the present invention.

A spinning reel in accordance with the first embodiment of the present invention is furnished with, as shown in FIG. 1, a reel unit 2 that rotatably carries a handle 1, a rotor 3, and a spool 4. The rotor 3 is rotatably carried on the front of the reel unit 2. The spool 4, onto the outer circumferential surface of which fishing line is wound, is arranged on the front of the rotor 3 so as to be shiftable front and back.

Figure 2:
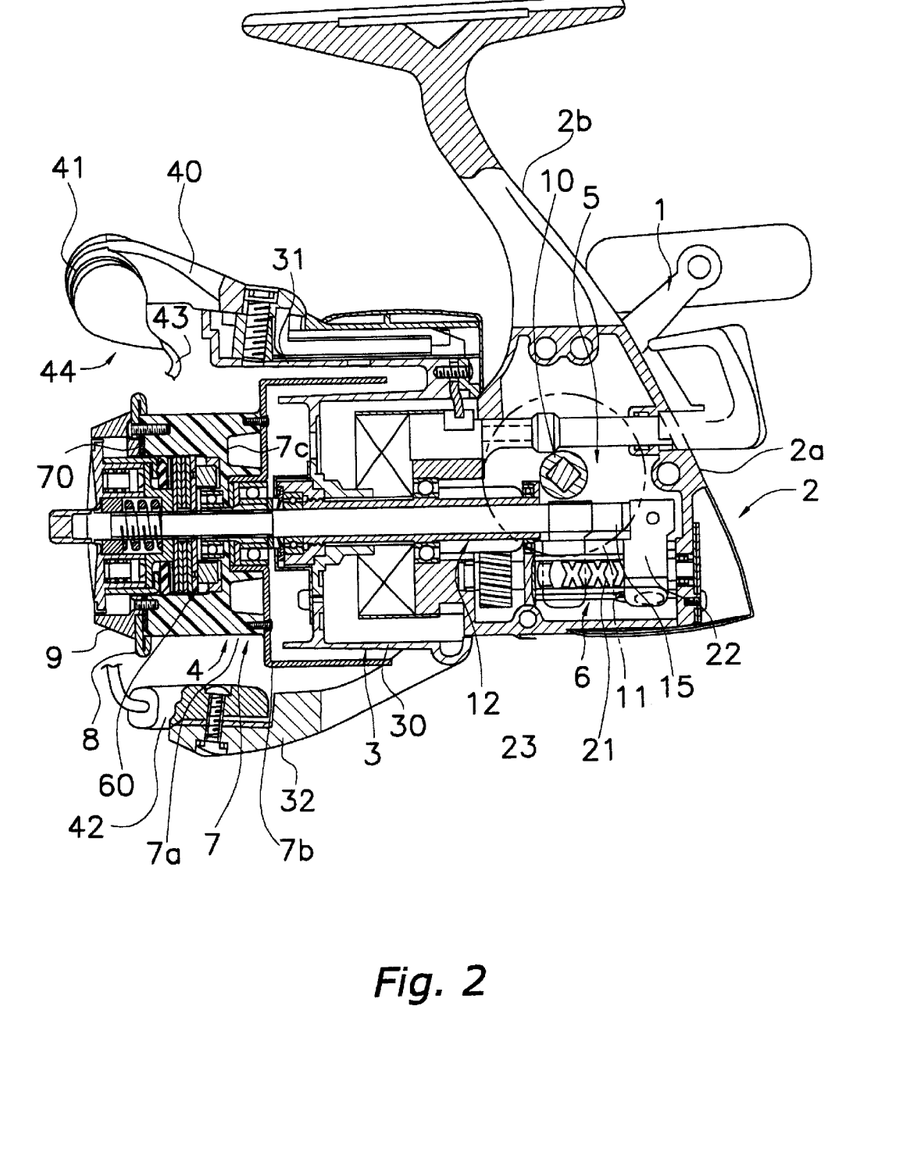
FIG. 2 is a left-side cross sectional view of the aforementioned spinning reel.

The reel unit 2 includes a reel body 2a, and a rod-attachment foot 2b extending diagonally up/frontward from the reel body 2a. In the interior of the reel body 2a is a hollow as indicated in FIG. 2. Installed within the hollow are a rotor-drive mechanism 5 that rotates the rotor 3 in sync with rotation of the handle assembly 1; and an oscillating mechanism 6 that pumps the spool 4 back and forth to wind fishing line onto the spool 4 uniformly.

The rotor drive mechanism 5 includes a face gear 11 that rotates together with a handle shaft 10 onto which the handle 1 is fastened, and a pinion gear 12 that meshes with the face gear 11. The pinion gear 12 is cylindrically formed, and its front portion passes through the center portion of the rotor 3, where the pinion gear 12 is fastened onto the rotor 3 by a nut. The pinion gear 12 is rotatably supported at the mid-portion and rear end in the axial direction via respective bearings in the reel unit 2.

The oscillating mechanism 6 is a device for causing a spool shaft 15 that is linked to the center portion of the spool 4 via a drag mechanism 60 to shift in the front-to-rear direction, thereby pumping the spool 4 in the same direction. The oscillating mechanism 6 has a worm 21 disposed beneath and parallel to the spool shaft 15, a slider 22 that moves in the front-to-rear direction along the worm 21, and an intermediate gear 23 affixed to the fore end of the worm 21. The hind end of the spool shaft 15 is non-rotatably affixed to the slider 22. The intermediate gear 23 meshes with the pinion gear 12.

The rotor 3, as shown in FIG. 2, includes a round cylinder portion 30; and first and second rotor arms 31, 32 opposing each other furnished sideways on the round cylinder portion 30. The round cylinder portion 30 and the two rotor arms 31, 32 are, e.g., aluminum-alloy manufactured, and are formed unitarily.

The first rotor arm 31 curving in an outward bulge extends frontward from the round cylinder portion 30, and the part joined with the round cylinder portion 30 is curved broadening in the circumferential direction of the round cylinder portion 30. A first bail-support member 40 is fitted pivotally onto the outer peripheral side of the fore end of the first rotor arm 31. A line roller 41 for guiding fishing line onto the spool 4 is fitted to the fore end of the first bail-support member 40.

The second rotor arm 32 curving in an outward bulge extends frontward from the round cylinder portion 30. Heading from its tip toward the area where it joins with the round cylinder portion 30, the second rotor arm 32 branches into two legs, which are connected with the round cylinder portion 30 in two places spaced at a circumferential interval. A second bail-support member 42 is fitted pivotally onto the outer peripheral side of the fore end of the second rotor arm 32.

A bail 43 of wire bent into a roughly U-shaped contour is fastened in between the line roller 41 and the second bail-support member 42. These first and second bail-support members 40, 42, the line roller 41, and the bail 43 compose a bail arm 44 that guides fishing line onto the spool 4. The bail arm 44 is pivotable in between a line-guiding posture, indicated in FIG. 2, and reversed from that into a line-releasing posture.

Spool Configuration

Figure 3:
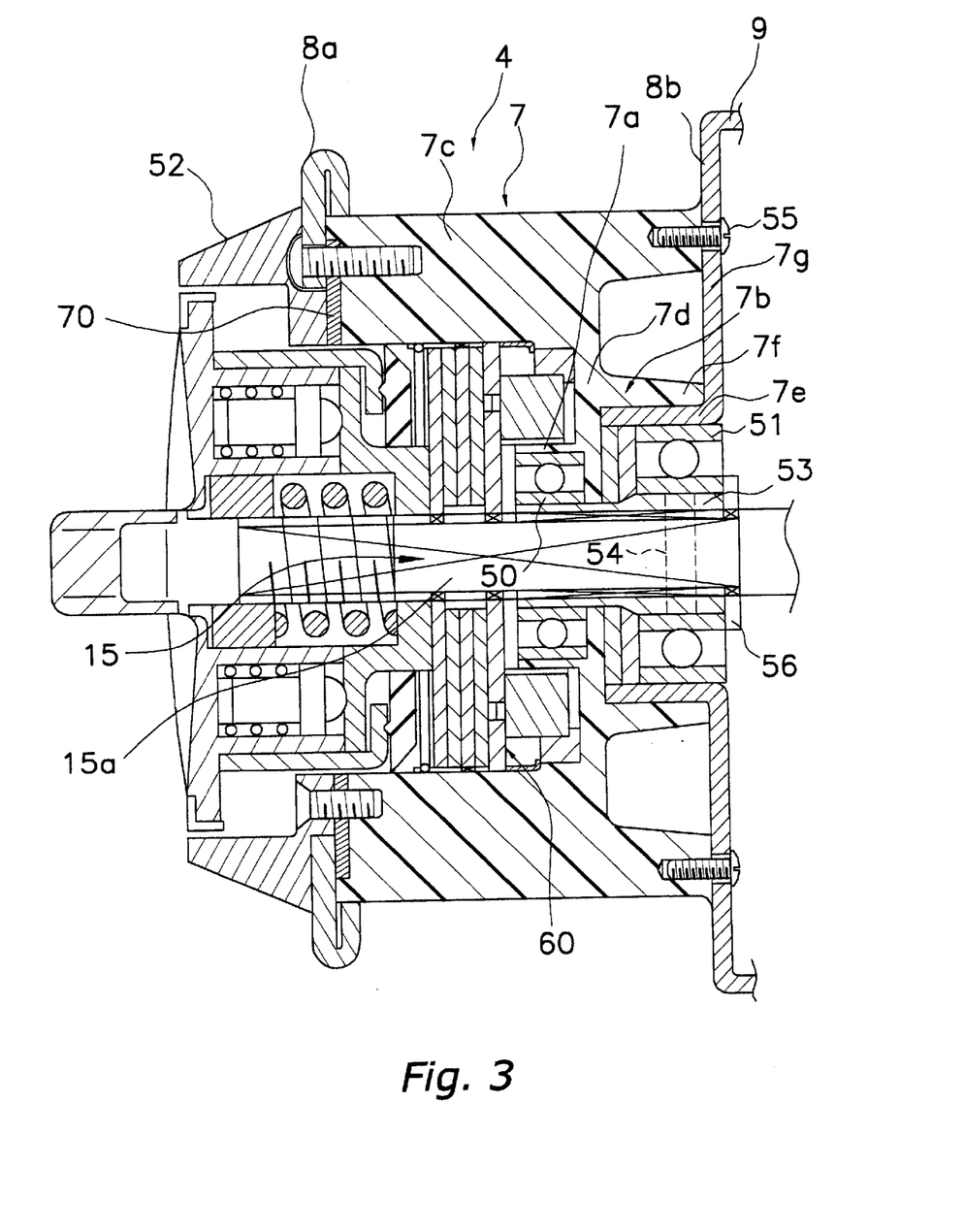
FIG. 3 is an enlarged cross sectional view of the spool in the aforementioned spinning reel.

The spool 4 is arranged in between the first rotor arm 31 and the second rotor arm 32 on the rotor 3, and is fitted onto the spool shaft 15 rotatably via two bearings 50 and 51, front and rear, which consist of ball bearings. As indicated in FIG. 3, chamfers 15a are formed parallel with each other on the fore-end portion of the spool shaft 15. The spool 4 has: first and second bearing housings 7a and 7b, in which the front and rear bearings 50 and 51 are housed; a bobbin trunk 7 in which the first and second bearing housings 7a and 7b are furnished; larger-diameter front and rear flanges 8a and 8b, arranged on the front and rear of the bobbin trunk 7; a skirt portion 9 formed integrally with the rear flange portion 8b and extending rearward from the outer periphery of the rear flange portion 8b; and a flange-fastening member 52 for fastening the front flange 8a to the bobbin trunk 7.

The bobbin trunk 7, outer-circumferentially onto which fishing line is wound, is a tubular component manufactured of a synthetic resin, and has a cylindrical portion 7c and a wall portion 7d that extends from the inner periphery of the cylindrical portion 7c toward the center. The drag mechanism 60, which brakes the rotation of the spool 4 in the line reel-out direction, is housed within the cylindrical portion 7c to the front of the wall portion 7d. Radially inward on the front face of the wall portion 7d, the front-end first bearing housing 7a is formed tube-shaped. Radially inward on the rear face of the wall portion 7d, the rear-end second bearing housing 7b is formed tube-shaped. A plurality of female threaded bores is formed on the front end of the bobbin trunk 7 to threadedly fix the front flange 8 and the flange fastening member 52 thereto.

The first bearing housing 7a is formed integrally with the wall portion 7d. The outer race of bearing 50 is fitted inside the first bearing housing 7a. The inner race of bearing 50 is mounted on a bearing support part 53 locked non-rotatably to the spool shaft 15. The bearing support part 53 is locked non-rotatably, axially immovably to the spool shaft 15 by an Allen stop-screw that penetrates the spool shaft 15. When the spool 4 is attached/reattached, bearing 50 comes undone from the bearing support part 53 together with the spool 4.

The second bearing housing 7b has a first tubular portion 7e which is disposed on an outer periphery of bearing 51 and in which the bearing 51 is housed, a circular plate portion 7g formed integrally with the first tubular portion 7e and fixedly coupled to the rear face of the bobbin trunk 7, and a second tubular portion 7f made of a synthetic resin and covering the first tubular portion 7e. The first tubular portion 7e and the circular plate portion 7g are obtained for example by press-forming a thin plate material of aluminum alloy manufacture, and have high-strength compared to the bobbin trunk 7. The first tubular portion 7e and the circular plate portion 7g are press-formed integrally with the rear flange portion 8b and the skirt portion 9. The press-formed rear flange portion 8b including the circular plate portion 7g is fixed to the rear face of the bobbin trunk 7 by mounting screws 55. The second tubular portion 7f, which is a part of the bobbin trunk 7 that projects rearward from the rear face of the bobbin trunk 7 is synthetic resin in manufacture, and is formed integrally with the bobbin trunk 7.

The outer race of bearing 51 is fitted inside the first tubular portion 7e of the second bearing housing 7b. Likewise, the inner race of bearing 51 is mounted onto the bearing support part 53. A lock washer 56 restrains the rear edge of the bearing 51 inner race against shifting rearward. When the spool 4 is attached/reattached, bearing 51 comes undone from the second bearing housing 7b and remains with the bearing support part 53. With this structure, even when the second bearing housing 7b is compressively deformed, the bearing 51 is less likely to come out of the second bearing housing 7b. Nonetheless, because the metal-manufactured first tubular portion 7e is furnished in the second bearing housing 7b and bearing 51 is fitted into the first tubular portion 7e, the second bearing housing 7b will not be susceptible to compressive deformation, meaning that bearing 51 will come out of the second bearing housing 7b easily. Moreover, the strength is fortified by the fact that the first tubular portion 7e and the circular plate portion 7g are formed as a single unitary tubular portion integrally with the rear flange portion 8b and the skirt portion 9 means, making deformation even less likely.

The rear flange portion 8b is an annular component manufactured of stainless steel, on which a curling process has been carried out to bend it back rearward. The front flange 8a is screw-fixed to the bobbin trunk 7. Likewise, the front flange 8a is also fastened to the bobbin trunk 7 by means of the flange-fastening member 52. A reinforcing member 70 made of metal is fitted in between the front end of the bobbin trunk 7 and the front flange 8.

The flange-fastening member 52 is made to be screw-fastened to the bobbin trunk 7 so that the flange-fastening member 52 clasps the front flange 8a with the front end of the bobbin trunk 7. Here, female-threaded holes in the flange-fastening member 52 are arranged in positions to be out of alignment with female-threaded holes in the front flange 8a.

The reinforcing member 70 is for example a ring-shaped plate component made of metal. Through-holes that communicate with female-threaded holes in the bobbin trunk 7, the front flange 8a, and the flange-fastening member 52 are formed in a number of places in the reinforcing member 70. The reinforcing member 70 is provided in order to prevent fishing line from getting pinched under the front flange 8a due to compressive deformation of the bobbin trunk 7. The outer periphery of the reinforcing member 70 is in contact with the rim of a round recess formed in the bobbin trunk 7.

The skirt portion 9 is a component made of metal, formed integrally with the rear flange portion 8b as described earlier. The skirt portion 9 is disposed so as to cover over the round cylinder portion 30 of the rotor 3.

In a spool 4 as such, installing the reinforcing member 70 made of metal on the front part of the bobbin trunk 7, and meanwhile installing the rear flange portion 8b on the rear part enables sustaining high strength in the bobbin trunk 7. Likewise, because the first tubular portion 7e, made of metal, is furnished in the second bearing housing 7b, mounting/dismounting the bearing 51 will be easy even if the bobbin trunk 7 compressively deforms.

Next, the procedure for detaching/reattaching the spool 4 will be explained.

When the spool is to be taken out, a drag knob on the drag mechanism 60 is twisted counterclockwise and taken off the spool shaft 15. Doing so releases the spool 4 from the spool shaft 15. Then, as described earlier, bearing 50 comes undone from the bearing support part 53 together with the spool 4, but bearing 51 remains on the bearing support part 53. Accordingly, in removing bearing 51 from the spool 4, because the second bearing housing 7b is reinforced by the first tubular portion 7e, even if fishing line is wound forcefully onto the spool 4, the second bearing housing 7b will not be susceptible to compressive deformation. This therefore eases drawing bearing 51 out from the spool 4.

Other Embodiments (a) The rear flange and the second bearing housing are formed integrally in the foregoing embodiment, but they may be formed separately.

Figure 4:
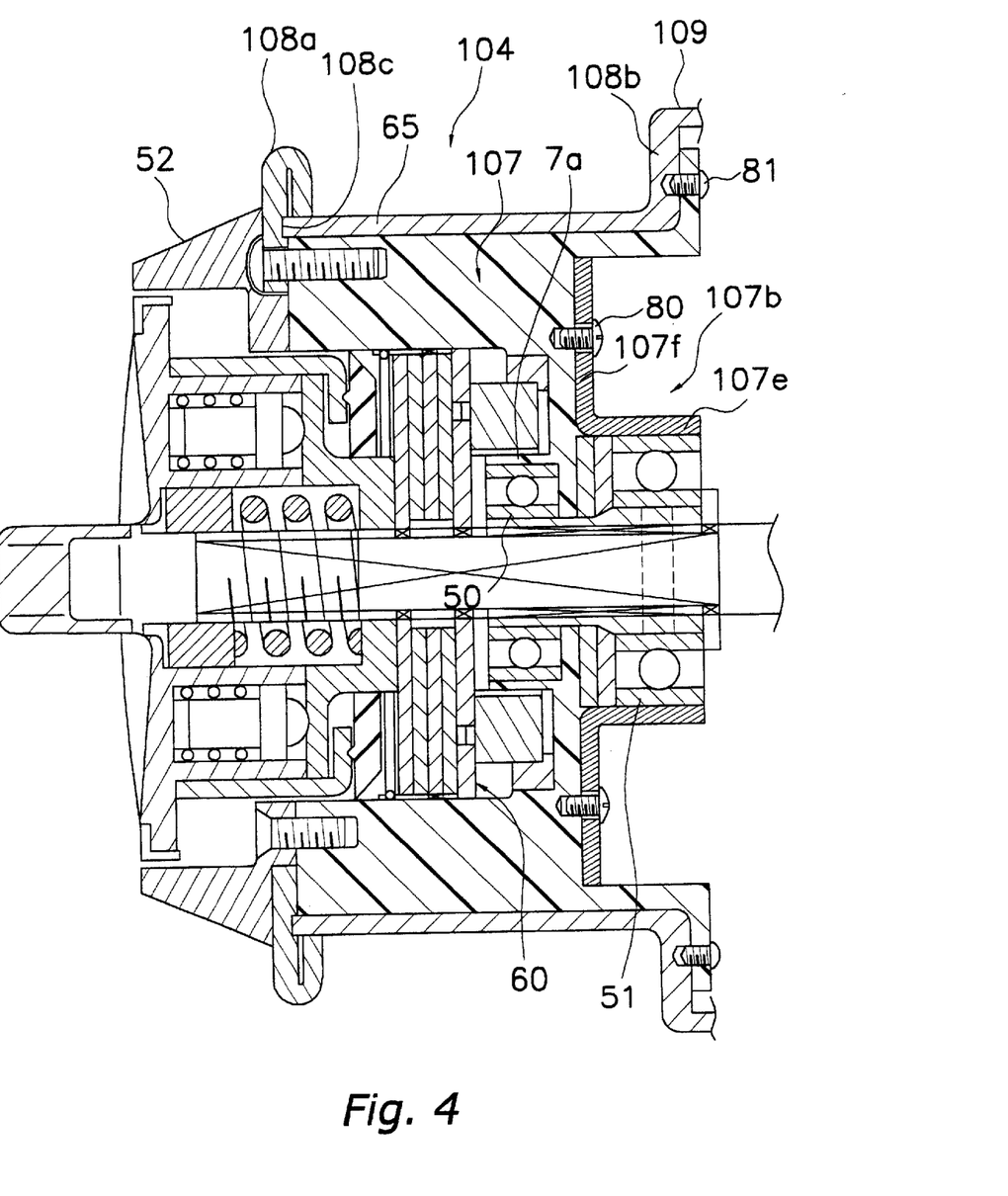
FIG. 4 is an enlarged cross sectional view of the spool according to the second embodiment, corresponding to FIG. 3.

As shown in FIG. 4, an outer sheathing member 65 made, e.g., of an aluminum alloy covers the outer periphery of a bobbin trunk 107. The outer circumferential surface of the bobbin trunk 107 in outward appearance thereby has a metallic luster, lending it a classic feel. The outer sheathing member 65 is press-formed integrally with a rear flange portion 108b and a skirt portion 109. Consequently, the press-worked article including the outer sheathing member 65 constitutes a large-small, dual-stage tubular component. This press-worked article is fixed to the bobbin trunk 107 by means of screws 81 in the rear flange portion 108b. The front rim of the outer sheathing member 65 is inserted into an annular groove 108c formed in a front flange 108a. This is to restrain deformation of the fore end of the outer sheathing member 65.

A second bearing housing 107b, a component obtained for example by press-forming a thin plate material of aluminum alloy manufacture, has a tubular portion 107e disposed encompassing bearing 51, and a circular plate portion 107f formed integrally with the tubular portion 107e and fixedly coupled to the rear face of the bobbin trunk 107. In this embodiment, the second bearing housing 107b is made of metal. The second bearing housing 107b reinforces the area in which the bearing 51 is housed, reinforcing the rear of the bobbin trunk 107 at the same time. Specifically, the circular plate portion 107f is fitted to the bobbin trunk 107 by engagement into an annular channel formed in its rear face, whereby the plastic bobbin trunk 107 is reinforced.

(b) The outer sheathing member 65 and the rear flange portion 108b are formed integrally in the foregoing alternate embodiment, but an outer sheathing member 165 may be formed in a single, unitary tube shape.

Figure 5:
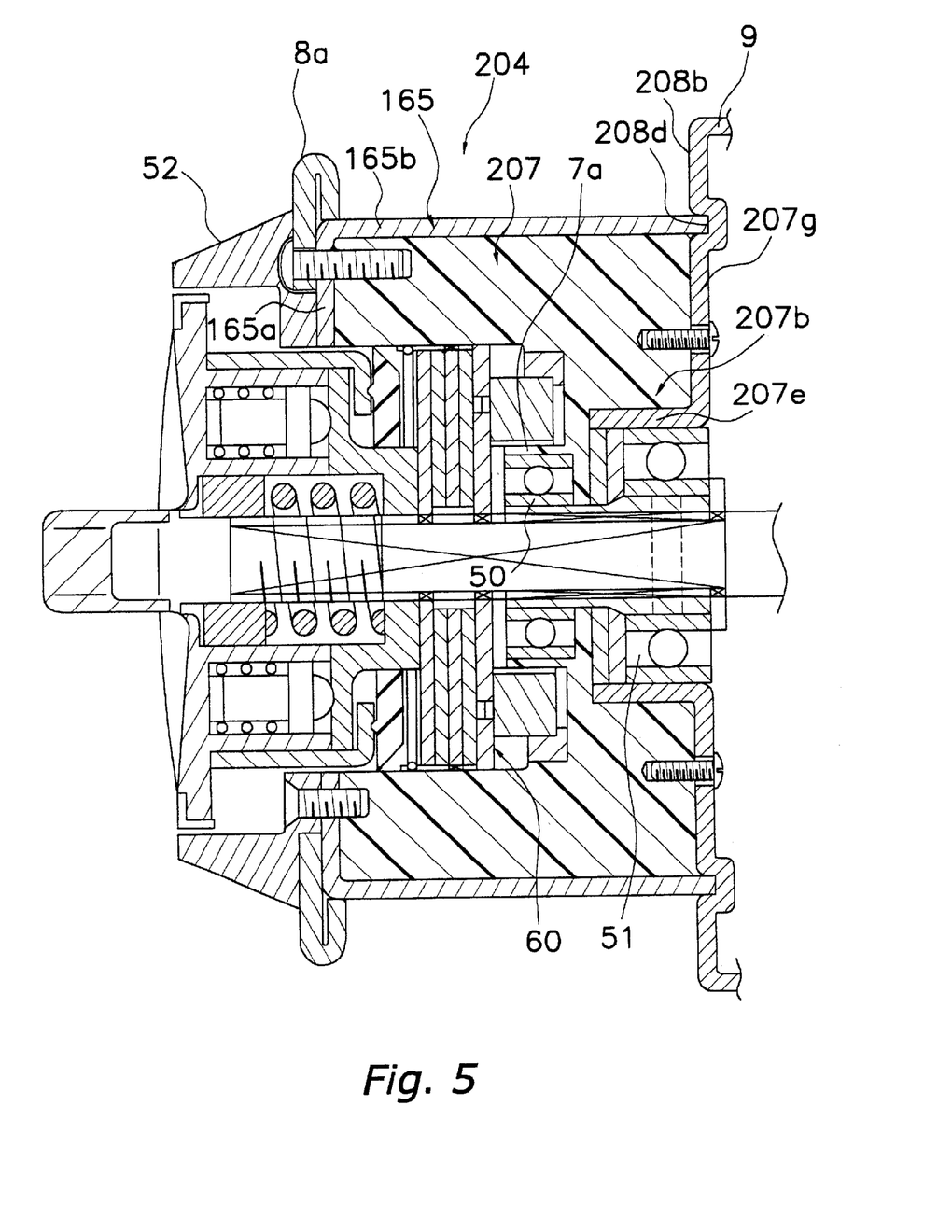
FIG. 5 is an enlarged cross sectional view of the spool according to the third embodiment, corresponding to FIG. 3.

As seen in FIG. 5, the outer sheathing member 165, manufactured of, e.g., an aluminum alloy, has a circular plate portion 165a, a tubular portion 165b formed integrally with the circular plate portion 165a and disposed on the outer circumferential surface of a bobbin trunk 207. The rear rim of the tubular portion 165b is inserted into an annular groove 208d formed in the rear flange 208b. This is to restrain deformation of the hind end of the outer sheathing member 165. Likewise, the circular plate portion 165a is formed integrally with, at the front end of, the outer sheathing member 165, to restrain deformation in that area.

A second bearing housing 207b has a tubular portion 207e disposed encompassing bearing 51 and a circular plate portion 207g formed integrally with the tubular portion 207e and fixedly coupled to the rear face of the bobbin trunk 207. The second bearing housing 207b is press-formed integrally with a rear flange portion 208b and the skirt portion 9. The tubular portion 207e is situated in between an inner periphery of the bobbin trunk 207, and bearing 51; and reinforcing the inner periphery, the bobbin trunk 207 is unlikely to compressively deform.

(c) In the foregoing embodiments, the first bearing housing is not reinforced, but the first bearing housing may be reinforced with a tubular part made of metal.

In the present invention, the bearing housing is reinforced by making it at least partially from a metal whose strength is higher than that of the synthetic resin. Therefore, the bearing housing is not liable to get compressed. Even should compressive force have an effect on the bobbin trunk, taking out and replacing the spool bearing will be easy.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-200624. The entire disclosure of Japanese Patent Application No. 2001-200624 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spool being adapted to be mounted rotatably on a spool shaft of a spinning-reel via a bearing, said spool comprising:
   a bearing housing portion in which the bearing is to be housed, at least a part of said bearing housing portion being made of metal;
   a synthetic-resin-manufactured bobbin trunk portion radially inside which said bearing housing portion is disposed, fishing line being adapted to be wound onto an outer-circumferential portion of said bobbin trunk portion; and
   front and rear flange portions larger in diameter than said bobbin trunk portion, said front and rear flange portions being disposed on the front and rear of said bobbin trunk portion such that at least a part of said bearing housing portion is disposed between said front and rear flange portions.

2. The spinning reel spool set forth in claim 1, further comprising a skirt portion extending rearward from the outer circumferential part of said rear flange portion.

3. The spinning reel spool set forth in claim 1, wherein said bearing housing portion includes a first tubular portion made of metal, in which the bearing is to be housed.

4. The spinning reel spool set forth in claim 3, wherein said bearing housing portion further includes a second tubular portion made of a synthetic resin, said second tubular portion covering said first tubular portion.

5. The spinning reel spool set forth in claim 3, wherein said bearing housing portion further includes a circular plate portion formed integrally with said first tubular portion and fixedly coupled to a rear face of said bobbin trunk.

6. The spinning reel spool set forth in claim 1, wherein said bearing housing portion is made of metal in its entirety.

7. The spinning reel spool set forth in claim 1, wherein at least a part of said bearing housing portion is formed integrally with said rear flange portion.

8. The spinning reel spool set forth in claim 2, wherein the outer circumferential portion of said bobbin trunk portion, onto which the fishing line is adapted to be wound, is covered by a sheathing member made of sheet metal.

9. The spinning reel spool set forth in claim 8, wherein said skirt portion is formed integrally with said sheathing member.

10. A spinning reel, comprising:
    a reel unit rotatably carrying a handle, said reel unit supporting a spool shaft;
    a rotor rotatably carried on a front portion of said reel unit; and
    a spool arranged on a front portion of said rotor so as to be shiftable front and back, said spool being adapted to be mounted rotatably on said spool shaft via a bearing, said spool comprising
      a bearing housing portion in which the bearing is to be housed, at least a part of said bearing housing portion being made of metal;
      a synthetic-resin-manufactured bobbin trunk portion in which said bearing housing portion is disposed, fishing line being adapted to be wound onto an outer-circumferential portion of said bobbin trunk portion; and
      front and rear flange portions larger in diameter than said bobbin trunk portion, said front and rear flange portions being disposed on the front and rear of said bobbin trunk portion.

11. The spinning reel set forth in claim 10, wherein said spool further comprises a skirt portion extending rearward from the outer circumferential part of said rear flange portion.

12. The spinning reel set forth in claim 10, wherein said bearing housing portion includes a first tubular portion made of metal, in which the bearing is to be housed.

13. The spinning reel set forth in claim 12, wherein said bearing housing portion includes a second tubular portion made of a synthetic resin, said second tubular portion covering said first tubular portion.

14. The spinning reel set forth in claim 12, wherein said bearing housing portion further includes a circular plate portion formed integrally with said first tubular portion and fixedly coupled to a rear face of said bobbin trunk.

15. The spinning reel set forth in claim 10, wherein said bearing housing portion is made of metal in its entirety.

16. The spinning reel set forth in claim 10, wherein at least a part of said bearing housing portion is formed integrally with said rear flange portion.

17. The spinning reel set forth in claim 11, wherein the outer circumferential portion of said bobbin trunk portion, onto which the fishing line is adapted to be wound, is covered by a sheathing member made of sheet metal.

18. The spinning reel set forth in claim 17, wherein said skirt portion formed integrally with said sheathing member.

* * * * *